United States Patent [19]

Ishikawa et al.

[11] Patent Number: 4,670,777
[45] Date of Patent: Jun. 2, 1987

[54] COLOR FILTER HAVING CYAN, YELLOW, GREEN AND MAGENTA FILTER ELEMENTS PROVIDING INCREASED DYNAMIC RANGE FOR USE WITH FIELD INTEGRATION MODE SOLID STATE IMAGING DEVICE

[75] Inventors: Kiyotsugu Ishikawa; Tohru Takamura, both of Takatsuki; Yoshiaki Sone, Toyonaka; Susumu Hashimoto, Moriyama; Masao Hiramoto, Katano, all of Japan

[73] Assignee: Matsushita Electric Industrial Co., Ltd., Osaka, Japan

[21] Appl. No.: 574,064

[22] Filed: Jan. 26, 1984

[30] Foreign Application Priority Data

Jan. 28, 1983 [JP] Japan ................................. 58-13457

[51] Int. Cl.⁴ ........................ H04N 9/077; H04N 9/07
[52] U.S. Cl. ......................................... 358/48; 358/44
[58] Field of Search ....................... 358/44, 41, 43, 48

[56] References Cited

U.S. PATENT DOCUMENTS 4,460,919  7/1984  Takemura .............................. 358/44
4,504,854  3/1985  Masuda ................................. 358/44

FOREIGN PATENT DOCUMENTS 675  1/1980  Japan .................................... 358/44
  39684  3/1982  Japan .................................... 358/44
 109488  7/1982  Japan .................................... 358/44

Primary Examiner—James J. Groody
Assistant Examiner—Randall S. Svihla
Attorney, Agent, or Firm—Spencer & Frank

[57] ABSTRACT

A color filter is constituted by unit arrays of two columns and four rows of filter elements. The first column has cyan, magenta, cyan, and green (or green, yellow, green and cyan) filter elements which are arranged in that order and the second column has yellow, green, yellow, and magenta (or magenta, cyan, magenta and yellow filter elements which are arranged in that order. A solid state image apparatus having an expanded dynamic range is realized by using this color filter in that the dynamic range of the photoelectric elements corresponding to the green filter elements can be utilized more efficiently.

11 Claims, 11 Drawing Figures

| G  | Mg | G  | Mg |
|----|----|----|----|
| Ye | Cy | Ye | Cy |
| G  | Mg | G  | Mg |
| Cy | Ye | Cy | Ye |
| G  | Mg | G  | Mg |

FIG. 3
(PRIOR ART)

| W $C_{11}$ | G $C_{12}$ | ← 21 |
| Ye $C_{21}$ | Cy $C_{22}$ | ← 22 |
| W $C_{31}$ | G $C_{32}$ | ← 23 |
| Cy $C_{41}$ | Ye $C_{42}$ | ← 24 |
| W $C_{51}$ | G $C_{52}$ | ← 25 |

FIG. 4

| Cy $C_{111}$ | Ye $C_{112}$ | ← 121 |
| Mg $C_{121}$ | G $C_{122}$ | ← 122 |
| Cy $C_{131}$ | Ye $C_{132}$ | ← 123 |
| G $C_{141}$ | Mg $C_{142}$ | ← 124 |
| Cy $C_{151}$ | Ye $C_{152}$ | ← 125 |

A FIELD
(ODD LINES)

A FIELD
(EVEN LINES)

B FIELD
(ODD LINES)

B FIELD
(EVEN LINES)

FIG. 7

| G | Mg | G | Mg |
|---|---|---|---|
| Ye | Cy | Ye | Cy |
| G | Mg | G | Mg |
| Cy | Ye | Cy | Ye |
| G | Mg | G | Mg |

COLOR FILTER HAVING CYAN, YELLOW, GREEN AND MAGENTA FILTER ELEMENTS PROVIDING INCREASED DYNAMIC RANGE FOR USE WITH FIELD INTEGRATION MODE SOLID STATE IMAGING DEVICE

BACKGROUND OF THE INVENTION

This invention relates to a color filter and a solid state imaging apparatus provided with this color filter.

As is well known, color television systems such as NTSC, PAL and SECAM are used in many countries. The interlaced scanning method is a standard method for detecting and representing the image information in these systems.

In order to reproduce an image on the usual receiver, it is necessary that the solid state imaging apparatus matches with these systems.

FIG. 1 is a diagram for the explanation of interlaced scanning. In this case, a character, e.g., A, is focussed onto the imaging surface of a solid state imaging device from which an image signal is derived. This figure shows a state in which photoelectric conversion is done at each scanning from top to bottom and from left to right, whereby a video signal corresponding to the image is detected. First, interlaced scanning is done in the order of 1A, 2A, 3A, . . . MA. After the scanning of the A field, scanning of the B field is done in the order of 1B, 2B, 3B, . . . , MB so that intermediate regions of the image between scanning lines 1A and 2A, 2A and 3A etc. are filled. By the scannings of the A-field and the B-field, a complete image of A, i.e. the whole image surface (1 frame), is constituted. In the NTSC system using the interlaced scanning, a television image is composed of 30 frames per second; 30 scannings per second of the A-field and 30 scannings per second of the B-field. According to this standard scanning method, video signals are read from each photoelectric element every 1/30 second. Such a method of reading out the signal is called the "frame integration mode".

On the other hand, the following method is used in the field of solid state imaging apparatus. According to this method, simultaneous scannings of line pairs (1A, 1B), (2A, 2B), (3A, 3B), . . . are performed first. In the A-field, signals are derived through respective signal lines and mixed in an external circuit as 1A+1B, 2A+2B, . . . . Then, the B-field scannings is performed in such a manner that line pairs (1B, 2A), (2B, 3A), (3B, 4A), . . . with one line shifted downwards are read out and mixed as 1B+2A, 2B+3A, 3B+4A, . . . . Scanning of one frame is thus finished. In this case, video signals are read from each photoelectric elements every 1/60 seconds.

This method is called the "field integration mode". Especially, the solid state imaging device has substantial merit in comparison with image tubes in that, in view of its principle of operation, it is free from the problem of a burned-in, and additionally has a low degree of residual image. In order to make the best use of this characteristic, interlaced scanning with the field integration mode is often desired, although the vertical resolution is more or less sacrified.

In order to constitute a single chip type color camera with one solid state imaging device, each picture element in the solid state imaging device 11 should be adjusted and mounted with each element of a color filter 12, as shown in FIG. 2. That is, picture elements $A_{11}, A_{12}, \ldots, A_{21}, A_{22}, \ldots$, etc. should be adjusted respectively and accurately with color filter elements $C_{11}, C_{12}, \ldots, C_{21}, C_{22}, \ldots$, etc.

External light 13, after passing through each color filter element $C_{11}, C_{12}, \ldots$, is focused on each picture element $A_{11}, A_{12}, \ldots$, and converted into signal charge. In the case of reading out the A-field where lines 21 and 22 are scanned, signal charges for pair picture elements $A_{11}$ and $A_{21}$, $A_{12}$ and $A_{22}, \ldots$, are mixed. When lines 23 and 24 are scanned, signal charges for pair picture elements $A_{31}$ and $A_{41}$, $A_{32}$ and $A_{42}$, $A_{33}$ and $A_{43}, \ldots$ are mixed. When lines 25 and 26 are scanned, signal charges for pair picture elements $A_{51}$ and $A_{61}$, $A_{52}$ and $A_{26}$, $A_{53}$ and $A_{63}, \ldots$ are mixed.

Next, in the case of reading out the B-field where lines 22 and 23 are scanned, signal charges for pair picture elements $A_{21}$ and $A_{31}$, $A_{22}$ and $A_{32}$, $A_{23}$ and $A_{33}$, . . . are mixed.

FIG. 3 shows the constitution unit of a color filter using the field integration mode. The unit consists of transparent filter elements (W) $C_{11}, C_{31}, C_{51}$; green light transmission filter elements (G) $C_{12}, C_{32}, C_{52}$; yellow light transmission filter elements (Ye) $C_{21}, C_{42}$; and cyan color transmission filter elements (Cy) $C_{22}, C_{41}$. The numerals 21 to 25 denote lines. Transparent filter elements transmit elementary color components red, blue and green; yellow light transmission filter elements transmit red and green primary light components; and cyan color transmission filter elements transmit blue and green primary color components.

In this color filter, transparent filter elements having a high light transmission factor are used. Therefore, it is a merit that the sensitivity becomes high in the region of these elements. However, since the transmission factors of Cy, Ye, W and G color filter elements are different, the amounts of signal charge from each picture element are different. The G-filter element has the minimum utilization factor of light. Hence, the amount of light necessary for saturating a picture element which is constituted by a photoelectric conversion element corresponding to a G-filter element becomes about three times as large as that necessary for a W-filter element. Even if other picture elements are not yet saturated, it happens that picture elements corresponding to W-filter elements are saturated. As a result, the dynamic range of the elements is limited by the region of W-filter elements. Consequently, and in contrast with a filter where the intensities of light transmitting through all the filter elements are nearly equal, the dynamic ranges of the picture elements, particularly of the picture elements corresponding to G-filter elements, are not fully utilized and thereby decreased.

SUMMARY OF THE INVENTION

This invention provides a color filter and a solid state imaging apparatus using this filter, in which a two-dimensionally arranged matrix unit is composed of two columns and four rows, the first column consisting of a sequential array of first, second, first and third filter elements selected out of a group of filter elements consisting of cyan, magenta, green and yellow, and the second column consisting of a sequential array of the above-mentioned fourth, third, fourth, and second filter elements.

BRIEF DESCRIPTION OF THE DRAWINGS

The present invention will be apparent from the following detailed description taken in conjunction with the accompanying drawings, in which:

FIG. 3 is a diagram for the explanation of the constitution units of the conventional color filter;

FIG. 4 is a diagram showing a color filter in accordance with this invention;

FIG. 7 is a diagram showing a color filter according to another embodiment of the present invention.

DETAILED DESCRIPTION OF THE PREFERRED EMBODIMENTS

A color filter of the present invention is constituted with two columns and four rows or lines, and used under the field integration mode.

FIG. 4 shows the constitution of a color filter in accordance with one embodiment of the present invention, which consists of cyan color light transmission filter elements $C_{111}$, $C_{131}$, $C_{151}$; yellow light transmission filter elements $C_{112}$, $C_{132}$, $C_{152}$; magenta color light transmission filter elements $C_{121}$, $C_{142}$; and green light transmission filter elements $C_{122}$, $C_{141}$. The numerals 121 to 125 denote each row or line.

As is well known, the cyan color transmission filter element transmits elementary light components blue and green; the magenta color transmission filter element transmits blue and red, and the yellow color transmission filter element transmits red and green.

Next, an explanation will be given of an electric output signal which is derived from a solid state imaging device provided with such a color filter as shown in FIG. 4.

Figure 1:
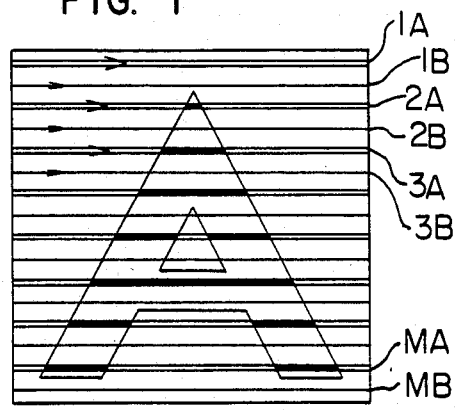
FIG. 1 is a diagram for the explanation of a scanning method.
Figure 2A:
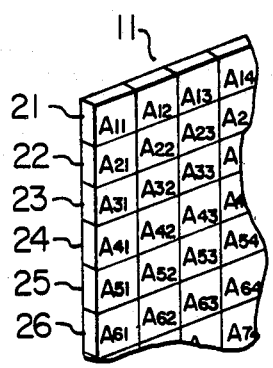
FIGS. 2a and 2b are diagrams for the explanation of the relationship between photoelectric elements and color filter elements of a solid state imaging device.
Figure 2B:
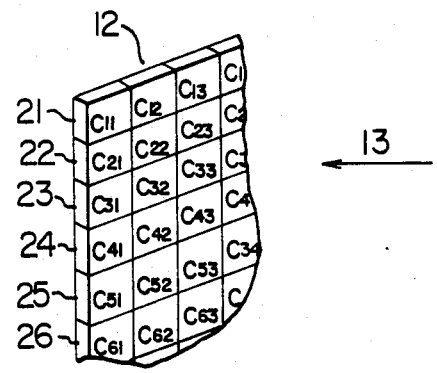
Figure 5A:
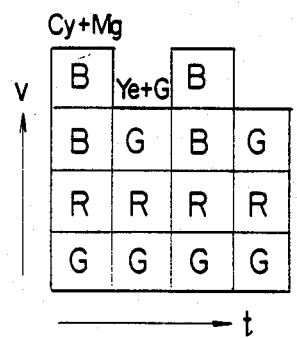
FIGS. 5a to 5d are diagrams for the explanation of the elementary color components of the above-mentioned color filter in accordance with the present invention.

FIG. 5a shows the electric outputs from the odd lines of the A-field when two picture elements, of the color filter of FIG. 4 are simultaneously read out (for example, lines 121 and 122 of FIG. 4 are simultaneously read out and these two lines are combined to be defined as an odd line).

Figure 5B:
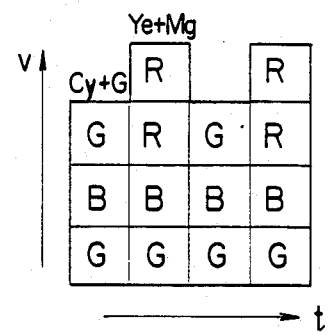
Figure 5C:
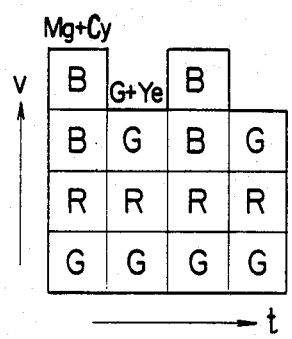
Figure 5D:
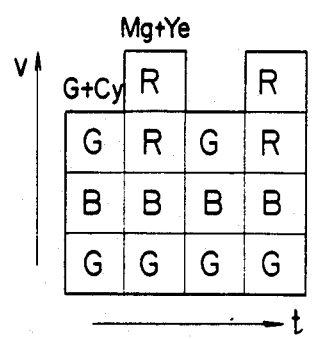

FIG. 5b shows the outputs from the even lines of the A field (lines 123 and 124 of FIG. 4 are simultaneously read out). FIG. 5c shows the outputs from the odd lines of the B-field (lines 122 and 123 of FIG. 4 are simultaneously read out). FIG. 5d shows the outputs from the even lines of the B-field (lines 124 and 125 of FIG. 4 are simultaneously read out). The ordinate denotes voltage v while the abscissa denotes time t. For the sake of explanation, elementary color components—red, green and blue—of the color filter elements corresponding to the respective picture elements are designated by R, G and B.

In FIGS. 5a-5d, a color difference signal is obtained by using a band-pass filter. For example, a color difference signal $(Cy+Mg)-(Ye+G)=(R+G+2B)-(R+2G)=2B-G$ (cf. FIG. 5a) is obtained on an odd line of the A-field, while a color difference signal $(Cy+G)-(Ye+Mg)=(2G+B)-(2R+G+B)=G-2R$ (cf. FIG. 5b) is obtained on an even line.

In a similar manner, a color difference signal, $(Mg+Cy)-(G+Ye)=(R+G+2B)-(R+2G)=2B-G$ (cf. FIG. 5c), is obtained on an odd line of the B-field while a color difference signal, $(G+Cy)-(Mg+Ye)=(2G+B)-(2R+G+B)=G-2R$ (cf. FIG. 5d), is obtained on an even line.

On the other hand, the luminance signal Y is obtained by passing the signals of FIGS. 5a-5d through a low-pass filter. The luminance signal Y becomes $Y=2R+3G+2B$ in all lines of the A and B-fields.

Next, an explanation will be made of an embodiment of the color separation method in a solid state imaging apparatus with reference to FIG. 6, where the filter shown in FIG. 4 is used. The imaging apparatus in the following embodiment comprises 380 horizontal picture elements and 512 vertical picture elements. A color difference signal $2B-G$ or $G-2R$ is obtained after the signal A, which is derived from an imaging device 27 having a color filter according to the present invention using the field integration mode, is passed through a band-pass filter 30 having a center frequency of 3.58 MHz and a band width of 1 MHz and then fed to a detection circuit 31. Since this color difference signal, after passing through a processing circuit 32, appears repeatedly as $2B-G$ or $G-2R$ for each odd or even line, a 1-horizontal-scanning-period (1 H) delay circuit 36 and a 1 H alternately switching circuit 37 are provided to get two colors, color difference signals $G-2R$ and $2B-G$.

The two kinds of color difference signals $G-2R$ and $2B-G$ obtained in this manner are introduced into an encoder 38. Meanwhile, the luminance signal Y is obtained as follows. Namely, the signal A derived from the imaging device 27 is passed through a low pass filter 28 having a band width of 3.58 MHz and a processing circuit 29. Then, the signal is supplied to the encoder 38, where it is mixed with the above-mentioned color difference signals $G-2R$ and $2B-G$ and a composite image signal is obtained.

As described above, the Y signal of the filter of this invention, which determines the camera sensitivity, is given by $Y=2R+3G+2B$. This signal has a smaller sensitivity than the Y signal, $Y=2R+4G+2B$, of the filter of FIG. 3. However, each constitution element of the filter of this invention consists of elementary color or complementary colors selected out of G, Mg, Ye and Cy. Therefore, the difference of the intensity of light having passed through these filter elements is reduced and hence the dynamic range of the color imaging apparatus is increased by about 3 dB.

Namely, the dynamic ranges of the filter elements of this invention are determined by complementary color filter elements of Mg, Ye and Cy. The light intensities of these color filter elements are all only about twice as large as that of the elementary color filter element G. Accordingly, since the dynamic range of the photoelectric element associated with the G-filter element increases after, the whole dynamic range can be increased. Moreover, color difference signals such as $G-2R$ and $2B-G$ can be obtained directly by using the color filter of the present invention shown in FIG. 4, and thus differently from then when using the conventional color filter of FIG. 3. Therefore, it is possible to simplify the signal processing circuit and to reduce the smear in the color signal.

Figure 7:
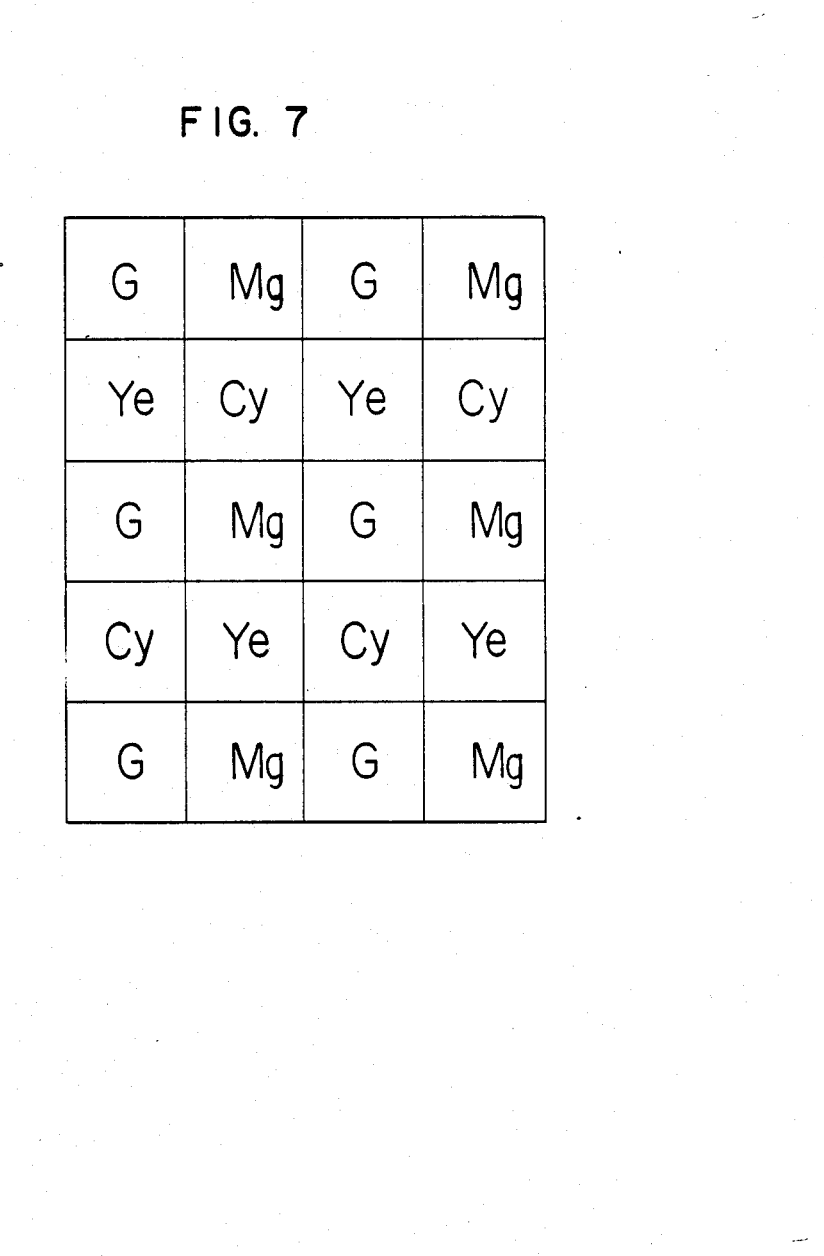

FIG. 7 shows another embodiment of the color filter according to this invention. As shown in this figure, the color filter, again consists of a two-dimensionally arranged matrix unit of filter elements of two columns and four rows. The first column of the matrix unit is composed of a repetition of green, yellow, green and cyan, while the second column is composed of a repetition of magenta, cyan, magenta and yellow.

Figure 6:
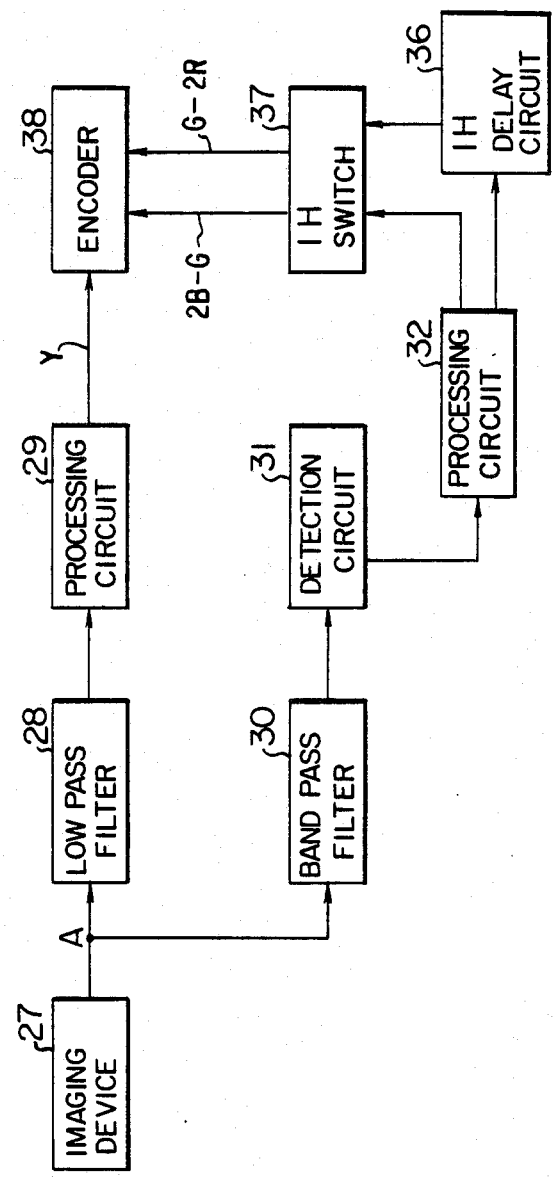
FIG. 6 is a block diagram of an image signal processing circuit in a solid state imaging apparatus in accordance with the present invention.

The same electric processing as shown in FIG. 6 is also performed with the color filter of this embodiment. Thus, color difference signals G−2R and 2B−G are obtained, as in the case of the color filter of FIG. 4.

Although the above explanation has been made of an imaging device according to the field integration mode it is needless to say that the above-mentioned color separation filter and processing circuit can be used in an imaging device operating according to the simultaneous double row or two line selecting method.

We claim:

1. A color filter comprising: a two-dimensional array of a plurality of separate filter elements arranged in columns and rows and forming a plurality of unit arrays; each said unit array including first, second, third and fourth types of said filter elements disposed in first and second columns and four rows with said first column comprising a sequential arrangement of said first, second, first and third types of filter elements and with said second column comprising a sequential arrangement of said fourth, third, fourth and second types of filter elements, and with said first, second, third and fourth types of filter elements being selected from a group consisting of cyan, magenta, green and yellow filter elements.

2. The color filter of claim 1, wherein said first second, third and fourth types of filter elements are cyan, magenta, green and yellow, respectively.

3. The color filter of claim 1, wherein said first, second, third and fourth types of filter elements are green, yellow, cyan and magenta, respectively.

4. The color filter of claim 1 wherein the filter elements in a row of said unit array are either cyan and yellow, or magenta and green.

5. A solid-state imaging apparatus comprising a solid-state imaging device and a color filter mounted on the front surface of said solid-state imaging device; and wherein:

said color filter is composed of a plurality of filter elements arranged in a plurality of unit arrays, with each said unit array including first, second, third and fourth types of filter elements disposed in a two-dimensional arrangement of first and second columns and four rows;

said first, second, third and fourth types of filter elements are selected from a group consisting of cyan, magenta, green and yellow filter elements;

said first column comprises a sequential arrangement of said first, second, first and third types of filter elements; and said second column comprises a sequential arrangement of said fourth, third, fourth and second types of filter elements.

6. The solid-state imaging apparatus of claim 5 wherein said first, second, third and fourth types of filter elements are cyan, magenta, green and yellow, respectively.

7. The solid-state imaging apparatus of claim 5, wherein said first, second, third and fourth types of filter elements are green, yellow, cyan and magenta, respectively.

8. The solid-state imaging apparatus of claim 5 wherein said solid-state imaging device includes a two-dimensional array of photosensors arranged in columns and rows and wherein each of said filter elements is associated with a respective one of said photosensors.

9. In an imaging apparatus including a solid-state imaging device having a two-dimensional array of photosensors arranged in columns and rows and operated in a field integration mode wherein charges stored in vertically adjacent photosensors in two adjacent rows are simultaneously read out and mixed to produce a signal having a color difference component and a luminance component, and a color filter array comprised of a two-dimensional array of first, second, third and fourth types of individual filter elements arranged in columns and rows with one said filter element being provided for each said photosensor; the improvement wherein: a first column, and each succeeding alternate column, of said array includes a repeating sequential arrangement of said first, second, first and third types of filter elements; a second column, and each succeeding alternate column, of said array includes a repeating sequential arrangement of said fourth, third, fourth and second types of filter elements; said first, second, third and fourth types of filter elements are selected from a group consisting of cyan, magenta, green and yellow filter elements; and the filter elements in adjacent rows of said two-dimensional array of filter elements are cyan and yellow, and magenta and green.

10. The imaging apparatus of claim 9 wherein said first, second, third and fourth types of filter elements are cyan, magenta, green and yellow, respectively.

11. The imaging apparatus of claim 9 wherein said first, second, third and fourth types of filter elements are green, yellow, cyan and magenta, respectively.

* * * * *